United States Patent [19]

Nagata et al.

[11] Patent Number: 5,383,682

[45] Date of Patent: Jan. 24, 1995

[54] STEERING WHEEL ASSEMBLY HAVING AN AIR BAG DEVICE

[75] Inventors: Atsushi Nagata; Toru Koyama, both of Inazawa; Norinari Nagata, Nakashima, all of Japan

[73] Assignee: Toyoda Gosei Co., Ltd., Nishikasugai, Japan

[21] Appl. No.: 206,826

[22] Filed: Mar. 7, 1994

Related U.S. Application Data

[63] Continuation of Ser. No. 51,734, Apr. 23, 1993, abandoned.

[30] Foreign Application Priority Data

Apr. 24, 1992 [JP] Japan .................................. 4-027449
Jan. 27, 1993 [JP] Japan .................................. 5-011950

[51] Int. Cl.⁶ .......................... B62D 1/04; B60R 21/16
[52] U.S. Cl. .................................... 280/777; 280/731
[58] Field of Search ............... 280/731, 728 R, 728 A, 280/777; 74/552, 492, 493

[56] References Cited

U.S. PATENT DOCUMENTS 3,895,823  7/1975  Stephenson .
5,024,464  6/1991  Kawaguchi et al. .

FOREIGN PATENT DOCUMENTS 63-235144  9/1988  Japan .
266368  5/1990  Japan .
4-166458  6/1992  Japan .

*Primary Examiner*—Karin L. Tyson
*Attorney, Agent, or Firm*—Cushman, Darby & Cushman

[57] ABSTRACT

A steering wheel having an air bag device which includes a ring portion, a boss portion, a bracket, a spoke and an air bag device. The boss portion has a boss and a boss plate extending laterally from the boss periphery. A bracket made of plastically deformable metal has a supporting portion inclined outwardly in opposite directions toward the ring portion. The air bag device is held at a predetermined distance from the boss plate by the bracket and includes a bag holder made of plastically deformable metal and having connecting portions inclined at the same angle as the supporting portions of the bracket. By providing supporting portions inclined in opposite directions, the steering wheel of the present invention can absorb impact energy not only by inflation of the air bag device but also by deformation of the supporting portions due to rotation of the air bag device during impact.

7 Claims, 9 Drawing Sheets

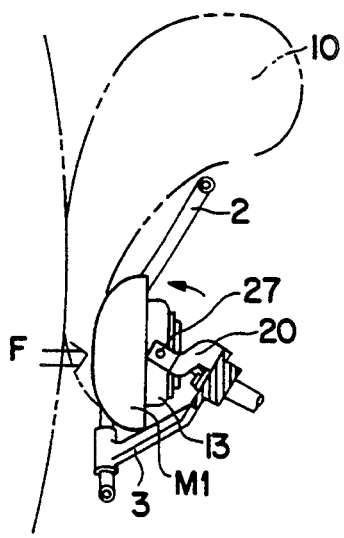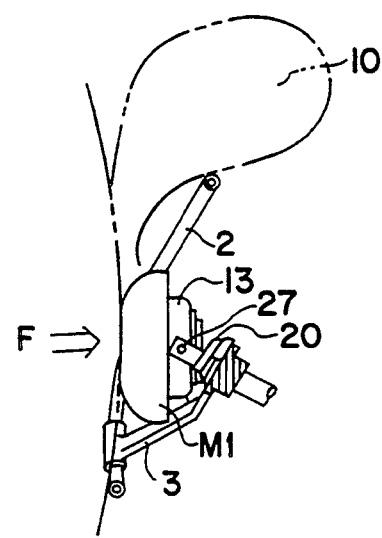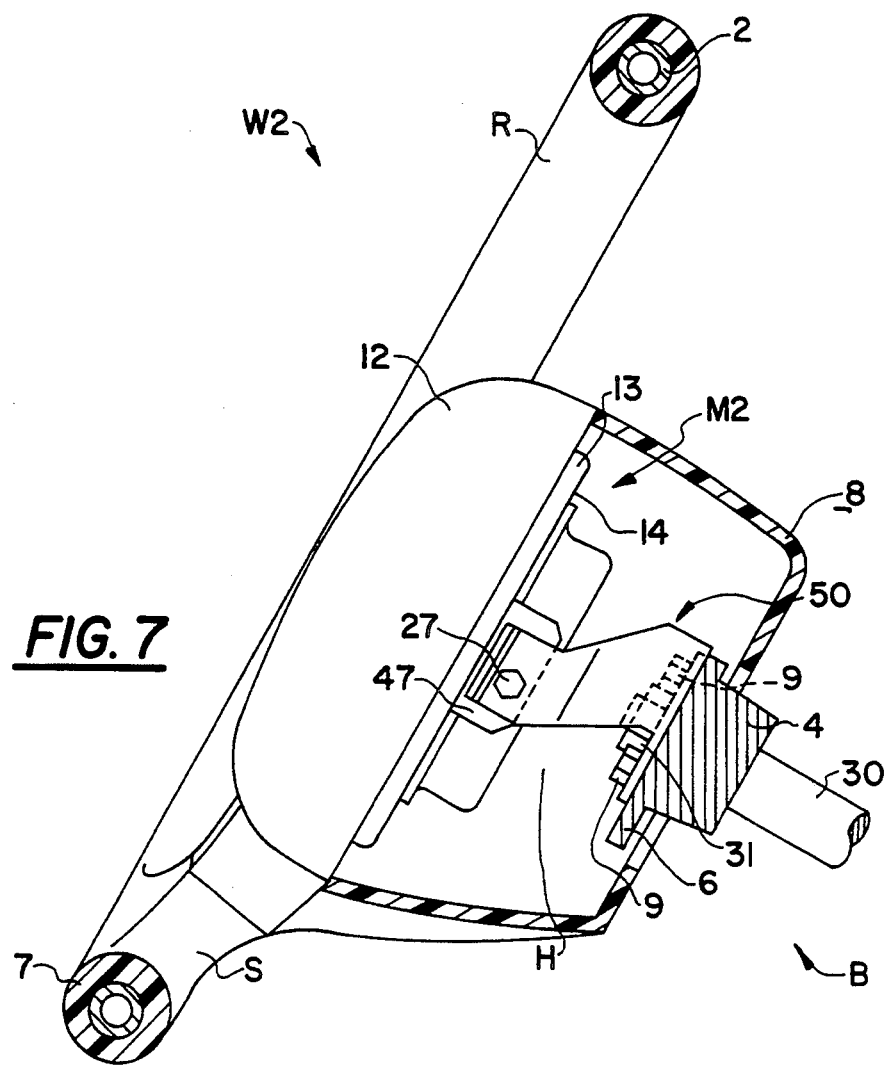

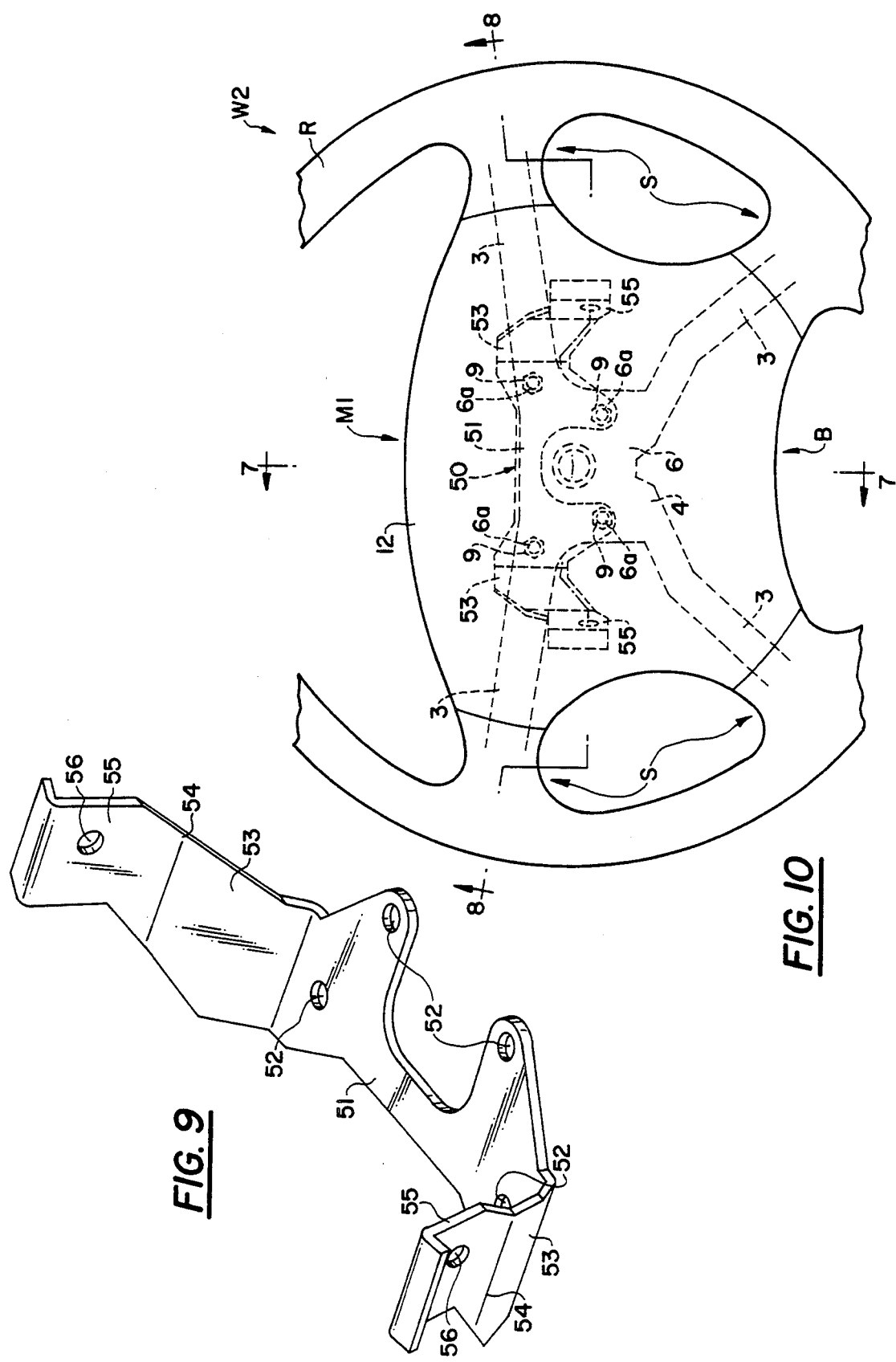

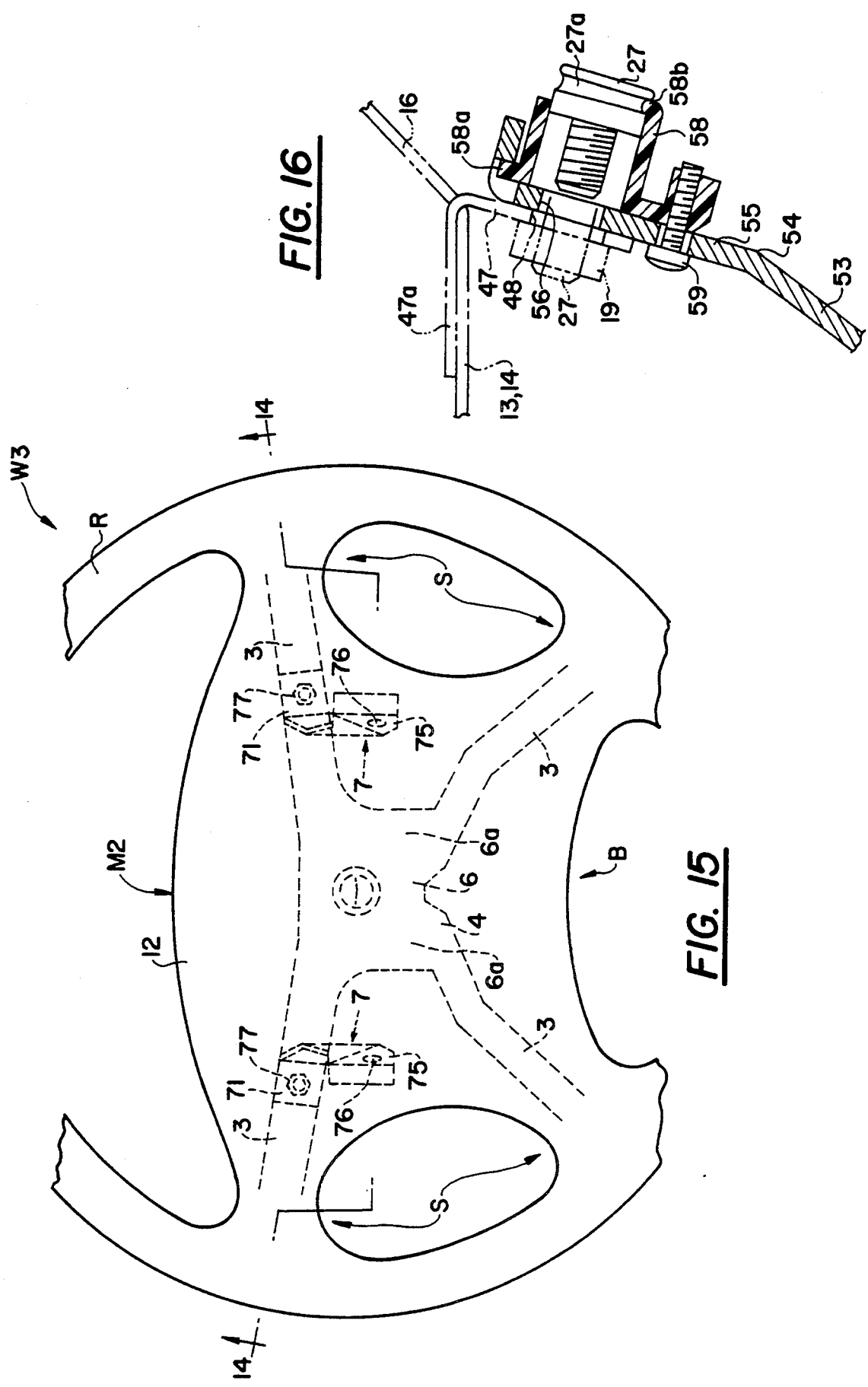

STEERING WHEEL ASSEMBLY HAVING AN AIR BAG DEVICE

This application is a continuation of application Ser. No. 08/051,743, which is abandoned.

BACKGROUND OF THE INVENTION

1. Field of the invention

The present invention relates to a steering wheel assembly having an air bag device for an automobile.

2. Description of related Art

In a conventional steering wheel assembly, at the center of the steering wheel an air bag device is supported capably of rotating in the vertical direction for aligning (e.g., those disclosed in Japanese Utility Model Unexamined Publication No. 2-66368).

However, since the conventional steering wheel assembly is supported only capably of rotating, it insufficiently absorbs impact energy.

SUMMARY OF THE INVENTION

It is an object of the present invention to provide a steering wheel assembly having an air bag device which is able to absorb properly not only by inflation of an air bag but also by the deformable structure of a bracket supporting the air bag device.

In accordance with the present invention, the steering wheel assembly comprises a ring portion, a boss portion, a bracket, a spoke and an air bag device. The boss portion has a boss for connecting to a steering shaft of a vehicle and a boss plate extending from the boss periphery. The bracket made of plastically deformable metal has supporting portions inclined outwardly in different directions toward the ring portion. The air bag device is held at a predetermined distance from the boss plate by the bracket and has a bag holder for holding the air bag, an inflater and pad. The bag holder is made of plastically deformable metal and has connecting portions inclined respectively along with the supporting portions of the bracket.

By providing supporting portions of the bracket inclined in the opposite directions, the steering wheel assembly of the present invention can absorb impact energy not only by inflation of the air bag device but also by deformation of the supporting portions due to rotation of the air bag device. Furthermore, by providing a bent portion in the bracket, the steering wheel assembly of the present invention will absorb more impact energy efficiently by yielding of the bracket.

BRIEF DESCRIPTION OF THE DRAWING

Other objects, features and characteristics of the present invention will become apparent upon consideration of the following description and the appended claims with reference to the accompanying drawings, all of which form a part of this specification.

FIG. 5 shows deformation caused by impact energy after the rotation of the air bag device in accordance with the first embodiment of the present invention, FIG. 6 shows deformation caused by impact energy after yield of the bracket in accordance with the first embodiment of the present invention, FIG. 7 is a cross-sectional view of a second embodiment of the FIG. 10 steering wheel taken along the line 7—7 in accordance with the present invention, FIG. 9 is a perspective view of a bracket of the FIG. 10 embodiment, FIG. 10 is a plan view of a second embodiment of the steering wheel in accordance with the present invention, FIG. 15 is a plane view of a third embodiment of the steering wheel in accordance with the present invention, and FIG. 16 is a partial sectional view showing a bolt holder.

DETAILED DESCRIPTION OF THE PREFERRED EMBODIMENTS

FIGS. 1 through 6 illustrate a first embodiment of a steering wheel assembly in accordance with the present invention.

Figure 1:
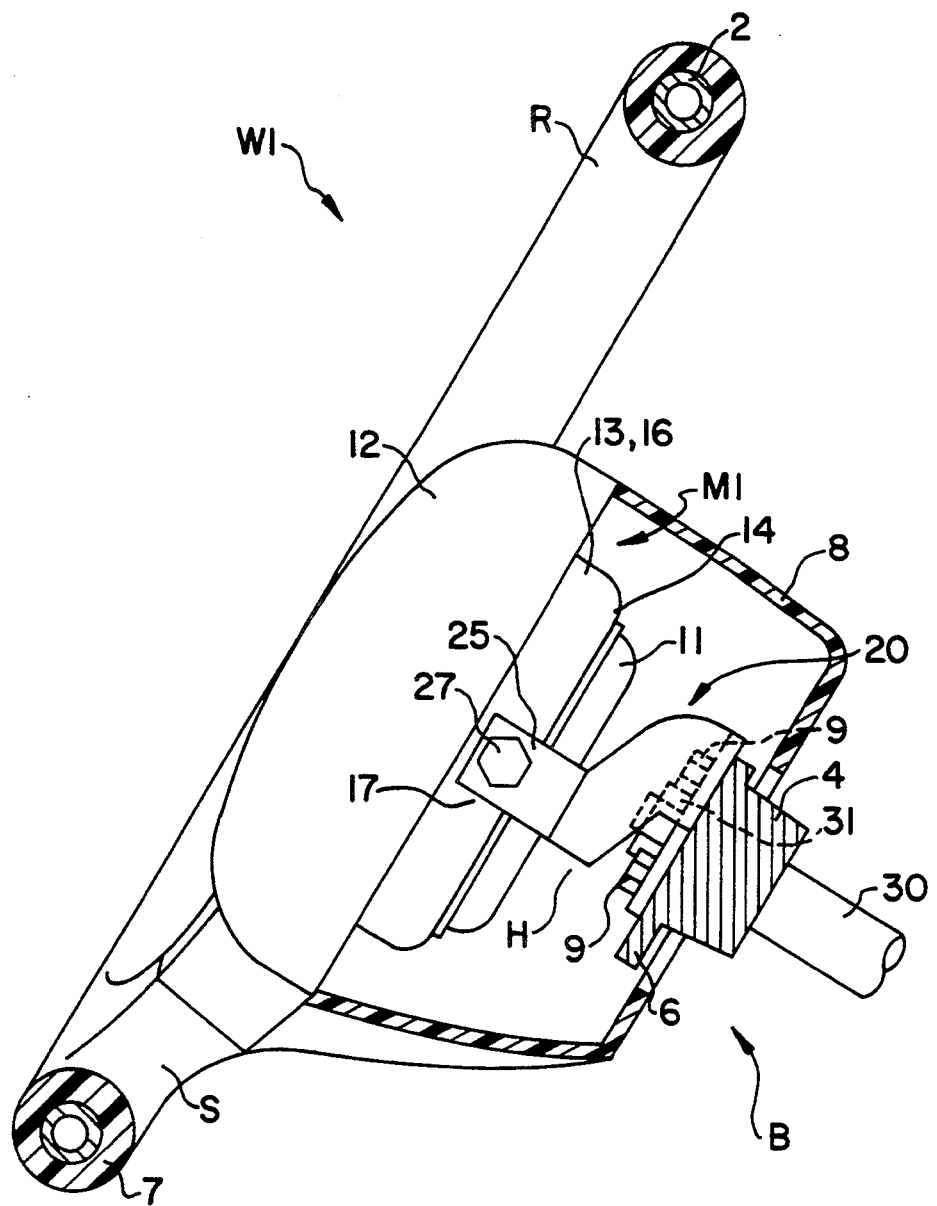
FIG. 1 is a cross-sectional view of a first embodiment of the FIG. 4 steering wheel taken along the line 1—1 in accordance with the present invention.
Figure 2:
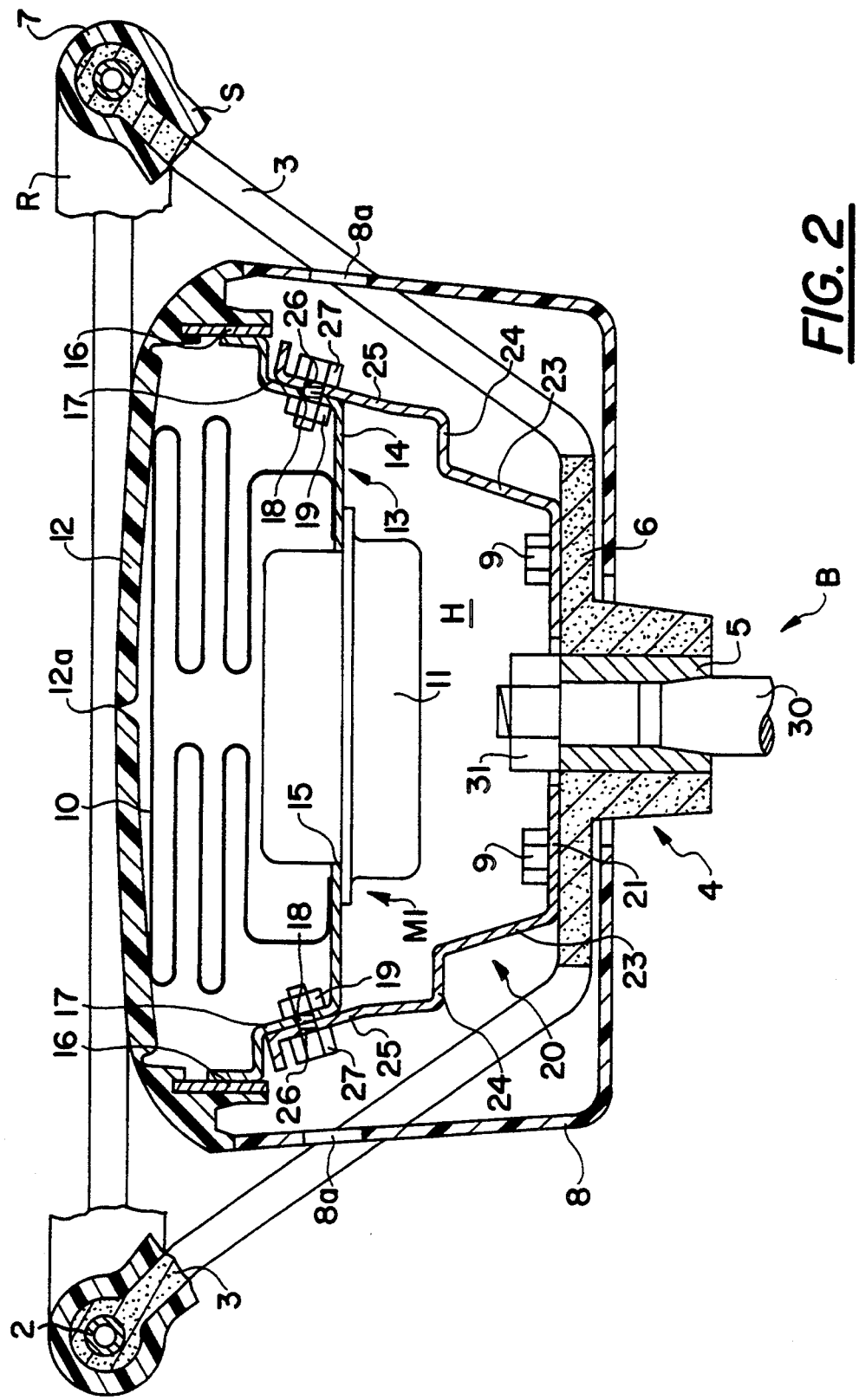
FIG. 2 is a cross-sectional view of the FIG. 4 embodiment taken along the line 2—2.
Figure 4:
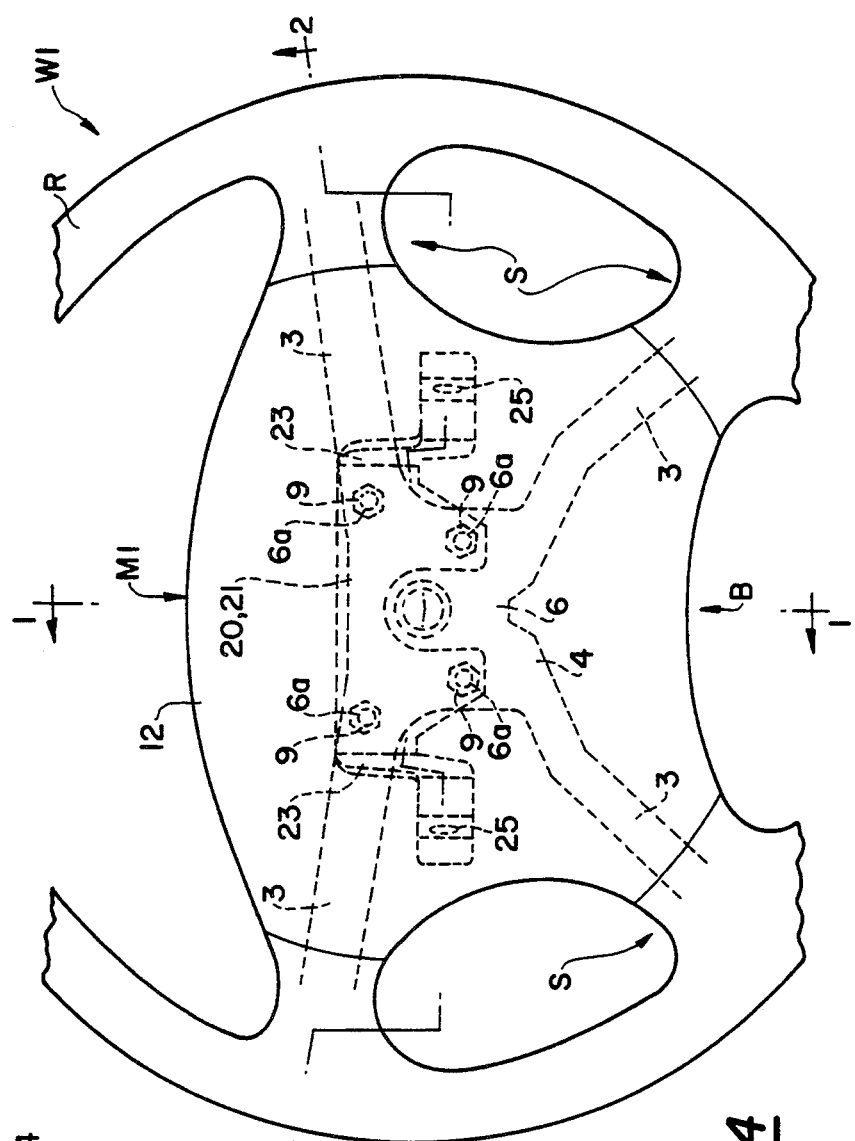
FIG. 4 is a plan view of a first embodiment of the steering wheel in accordance with the present invention.

A steering wheel assembly in the first-embodiment has, as shown in FIGS. 1, 2 and 4, a ring portion R, a boss portion B placed at the center of ring portion R and four spokes S connecting the ring portion R with the boss portion B.

Furthermore specifically, a steering wheel W1 has a metal core comprising a ring part metal core 2 mounted in the ring portion R, spoke part metal cores 3 mounted in each spoke S and boss part metal core 4 mounted in the boss portion B. The boss part metal core 4 has a boss 5 for connecting to a steering shaft of a vehicle and a boss plate 6 extending from a periphery of the boss 5. In addition, the ring core 2 and a ring side part of the spoke cores 3 are covered by a skin layer 7 made of soft synthetic resin such as foamed urethane. In the first embodiment, since the ring part metal core and the boss are made of steel and the spoke part metal cores 3 and the boss plate 6 are made of an alloy of aluminum by die-casting, the ring part metal core 2 and the boss 5 are uniformly inserted into the spoke part metal cores 3 and the boss plate 6 when the spoke part metal cores 3 and the boss plate 6 are formed by the aluminum die-casting method. The boss plate 6 has four holes 6a in order to attach a bracket 20 by screws 9.

An air bag device M1 is placed opposite to the boss 5 at the center of the ring portion R. The air bag device comprises a folded expandable air bag 10, an inflater 11 for inflating the air bag 10, a pad 12 for covering the air bag 10 and a bag holder 13 for holding the air bag 10, the inflater 11 and the pad 12. The bag holder 13 is made of plastically deformable steel as a box like shape and has a inflater holding hole 15 for placing the inflater 11 therein at the bottom portion 14. Connecting portions 17 are inclined in an upward and outward direction opposite to each other at both side wall portions 16, and connecting holes 18 have weld nuts 19 welded respectively on the connecting portions 17. The pad 12 has a thin portion 12a which is capable of breaking in case of expansion of the air bag 10. The air bag device M1 is supported at the center of the ring portion R at a distance H from the boss plate 6 by the bracket 20 attached to the boss plate 6 of the metal core 1.

Figure 3:
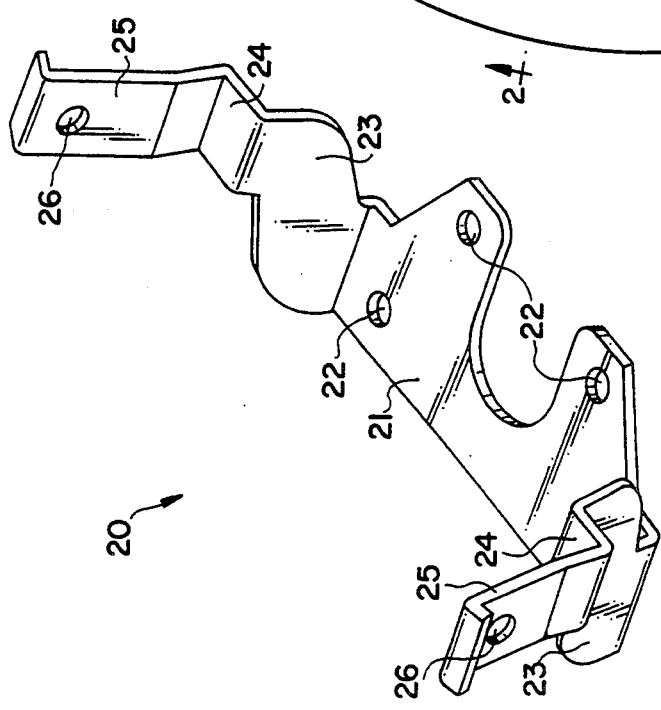
FIG. 3 is a perspective view of a bracket of the FIG. 4 embodiment.

The bracket 20 is, as shown in FIGS. 2 and 3, made of metal such as plastically deformable steel with a U-shape and has a bottom portion 21 and two side portions 23, 23 extending upwardly from both side edges of the bottom portion 21. The bottom portion 21 has four holes 22 in accordance with four holes 6a of the boss plate 6. The side portions 23, 23 have bent portions 24 for deforming easily here and supporting portions 25 for attaching to the connecting portions 17 of the bag holder 13. Supporting portions 25 are upwardly and outwardly inclined in opposite directions the same as connecting portions 17 of the bag holder 13 at the top of the side portion 23. The supporting portions 25 have holes 26 in accordance with the connecting holes 18 of the bag holder 13, respectively.

In the first embodiment, the air bag device M1 is assembled to the steering wheel W1 by the following steps. The holes 22 of the bracket 20 are respectively aligned with the holes 6a of the boss plate 6, then the bracket 20 is fixed to the boss plate 6 by the screw 9. After that, the connecting portions 17 of the bag holder 13 are respectively attached to the supporting portions 25 of the bracket 20, then the connecting portions 17 are respectively fix to the supporting portions 25 by bolts 27 screwed respectively into the nuts 19 welded at the holes 18 of the bag holder 13 through holes 8a in the sides of the lower cover 8 and though the holes 26 of the supporting portions 25. According to these steps, the air bag device M1 is attached to the steering wheel W1 at the desired distance H from the boss plate 6.

The lower cover 8 made of hard synthetic resin is attached to the boss plate 6 by screws before the air bag device M1 is attached to the steering wheel W1. In addition, the steering wheel W1 should be attached to the steering shaft of the vehicle by nut 31 before the air bag device M1 is assembled to the bracket 20.

In case impact energy F acting towards the front direction of the vehicle acts on the air bag device M1 after air bag 10 has inflated through the broken portion of the pad 12, the bracket 20 would be deformed as shown in FIG. 5. Namely, although the impact energy F causes rotation of the connecting portions 17 around the bolts 27, the connecting portion 17 and the supporting portions 25 are inclined in an upward and outward direction opposite to each other, so that the connecting portions 17 twist the supporting portions 25 of the bracket 20. Hence, the connecting portions 17 of the bag holder 13 deform respectively the supporting portions 25 of the bracket 20. As a result, since the air bag device M1 rotates around the bolts 27, it faces the impact energy force F perpendicularly.

Therefore, the steering wheel assembly W1 according to the first embodiment can absorb impact energy not only by inflation of the air bag device M1 but also by plastic deformation of the supporting portion 25 of the bracket 20, thereby increasing the amount of impact energy that can be absorbed.

In addition, according to the first embodiment of the present invention, if more impact energy acts after the deformation described above, the bent portions 24 of the bracket 20 are deformed as shown in FIG. 6 so that the side portions 23 of the bracket 20 yield until the air bag device M1 contacts the boss plate 6. Therefore, the impact energy is absorbed even more by the further yield of the bracket 20.

Next, a steering wheel W2 in accordance with the second embodiment will be described in connection with FIGS. 7, 8, 9, 10, 11 and 12 in which parts similar to those in FIGS. 1 through 6 are given the same reference numerals. In this steering wheel W2 connecting portions 47 of air bag device M2 are also deformable in addition to the supporting portions 55 of the bracket 50 due to rotation of the air bag device M2 by impact energy.

In the second embodiment, the air bag device M2 comprises a folded expandable air bag 10, an inflater 11 for inflating the air bag 10, a pad 12 for covering the air bag 10 and a bag holder 13 for holding the air bag 10, the inflater 11 and the pad 12. The bag holder 13 made of plastically deformable steel in a box-like shape has an inflater holding hole 15 for placing the inflater 11 therein at the bottom portion 14, and connecting portions 47 are inclined in a direction opposite to each other. The connecting portions include connecting parts 47a welded to the bottom portions 14 of the bag holder 13 through the side wall portions 16. The connecting portions 47 are made of plastically deformable steel with an inverted L-shape and have connecting holes 48 and weld nuts 19 welded thereon respectively at the connecting holes 48. The air bag device M2 is supported at the center of the ring portion R at a distance H from the boss plate 6 by a bracket 50 attached to the boss plate 6 of the metal core.

Figure 8:
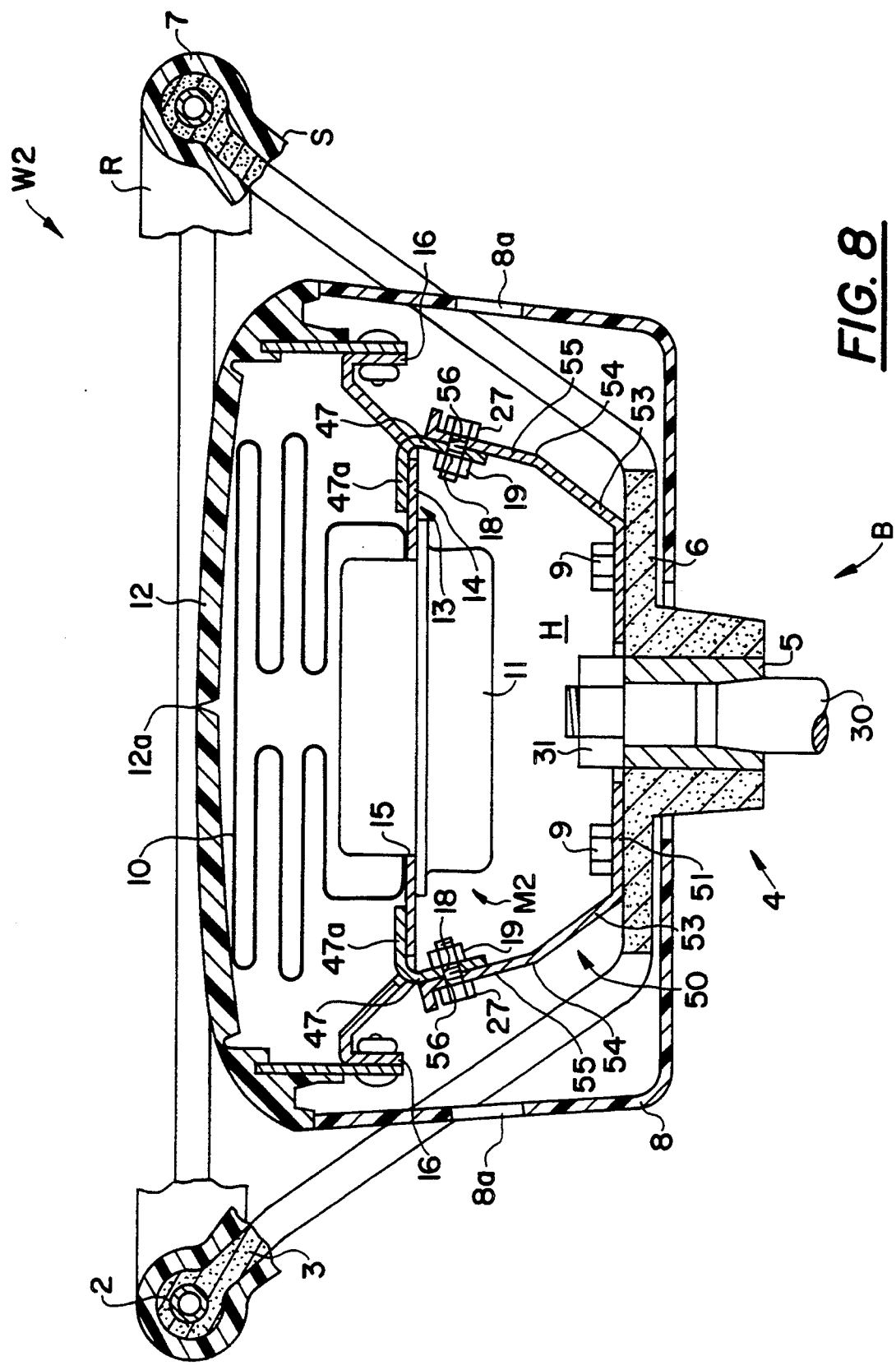
FIG. 8 is a cross-sectional view of the FIG. 10 embodiment taken along the line 8—8.

The bracket 50 is, as shown in FIGS. 8 and 9, made of metal such as plastically deformable steel with a U-shape and has a bottom portion 51 and two side portions 53, 53 extending upwardly from opposite side edges of the bottom portion 51. The bottom portion 51 has four holes 52 for alignment with four holes 6a of the boss plate 6. The side portions 53, 53 are bent at bent portion 54 for deforming easily here, and inclined supporting portions 55 are attached respectively to the connecting portions 47 of the bag holder 13. Connecting portions 47 are inclined in an upward and outward direction opposite to each other at the top of the side portion 53. The supporting portions 55 have holes 56 in accordance with the connecting holes 48 respectively.

In the second embodiment, the air bag device M2 is assembled to the steering wheel W2 by the same steps as the first embodiment.

Figure 11:
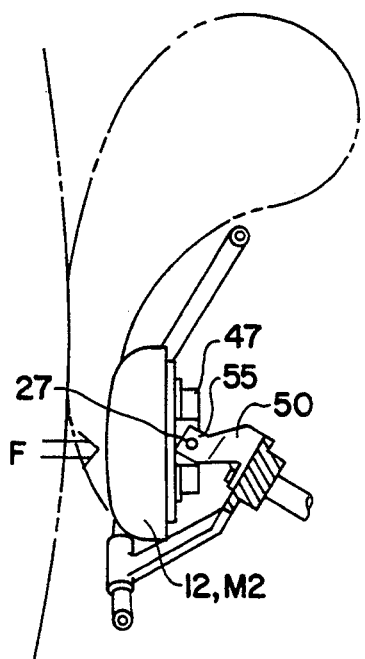
FIG. 11 shows deformation caused by impact energy after the rotation of the air bag device in accordance with the second embodiment of the present invention.

In case impact energy F acting towards the front direction of the vehicle acts on the air bag device M2 after air bag 10 has inflated through the broken portion of the pad 12, the bracket 50 would be deformed as shown in FIG. 11. Namely, although the impact energy F causes rotation of the connecting portions 47 around the bolts 27, the connecting portion 47 and the supporting portions 55 are inclined in an upward and outward direction opposite to each other, so that the connecting portions 47 twist the supporting portions 55 of the bracket 50. Additionally, in the second embodiment, since the stiffness of connecting portions 47 is relatively weak, the connecting portions 47 are also deformed by the supporting portions 55 at the same time. As a result, since the air bag device M2 rotates around the bolts 27, it faces the impact energy force F perpendicularly.

Therefore, the steering wheel assembly according to the second embodiment can absorb impact energy not only by inflation of the air bag device M2, but also by plastic deformation of both the connecting portions 47 and the supporting portions 55, thereby increasing the amount of impact energy that can be absorbed.

Figure 12:
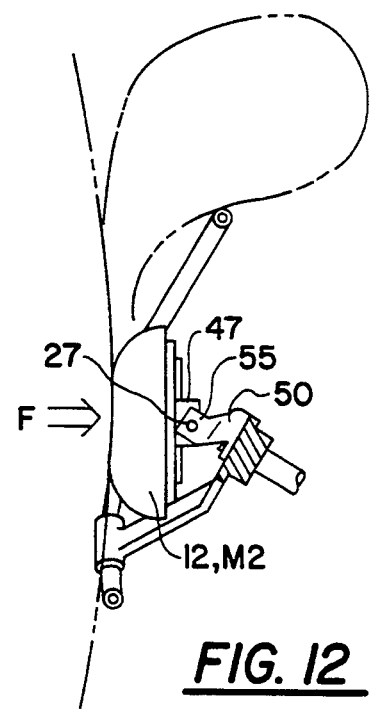
FIG. 12 shows deformation caused by impact energy after yield of the bracket in accordance with the second embodiment of the present invention.

In addition, as in the first embodiment, according to the second embodiment of the present invention, if more impact energy acts after the deformation described above, the bent portions 54 of the bracket 50 are deformed as shown in FIG. 12 so that the side portions 53 of the bracket 50 yield until air bag device M2 contacts the boss plate 6. Therefore, the impact energy is absorbed even more by the further yield of bracket 50.

Figure 13:
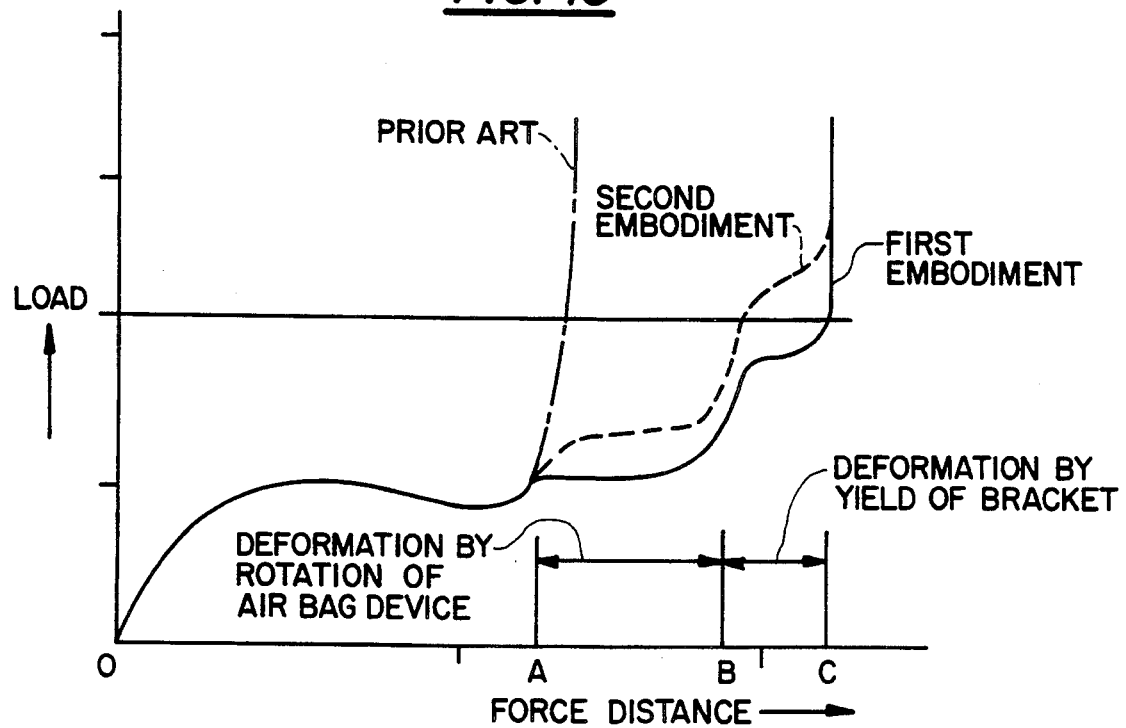
FIG. 13 is a graph of force distance causing deformation in relation to load for both the first and second embodiments.

FIG. 13 shows the force distance causing deformation in relation to load for the prior art and for both the first and second embodiments all three of which are the same up to point A. Thereafter, the solid line represents the first embodiment, the dash line the second embodiment and the chain line the prior art. In the first and second embodiments, deformation by rotation of the air bag device is caused by the further force distance A-B while the succeeding force distance B-C cause additional deformation by yielding of the bracket 20 or 50. The prior art does not allow deformation of the air bag device regardless of the amount of the impact energy on the inflated bag. Since the amount of absorbed energy is indicated by the area under the curve, the steering wheels W1 and W2 of this invention can sufficiently absorb impact energy acting to the steering wheels.

Figure 14:
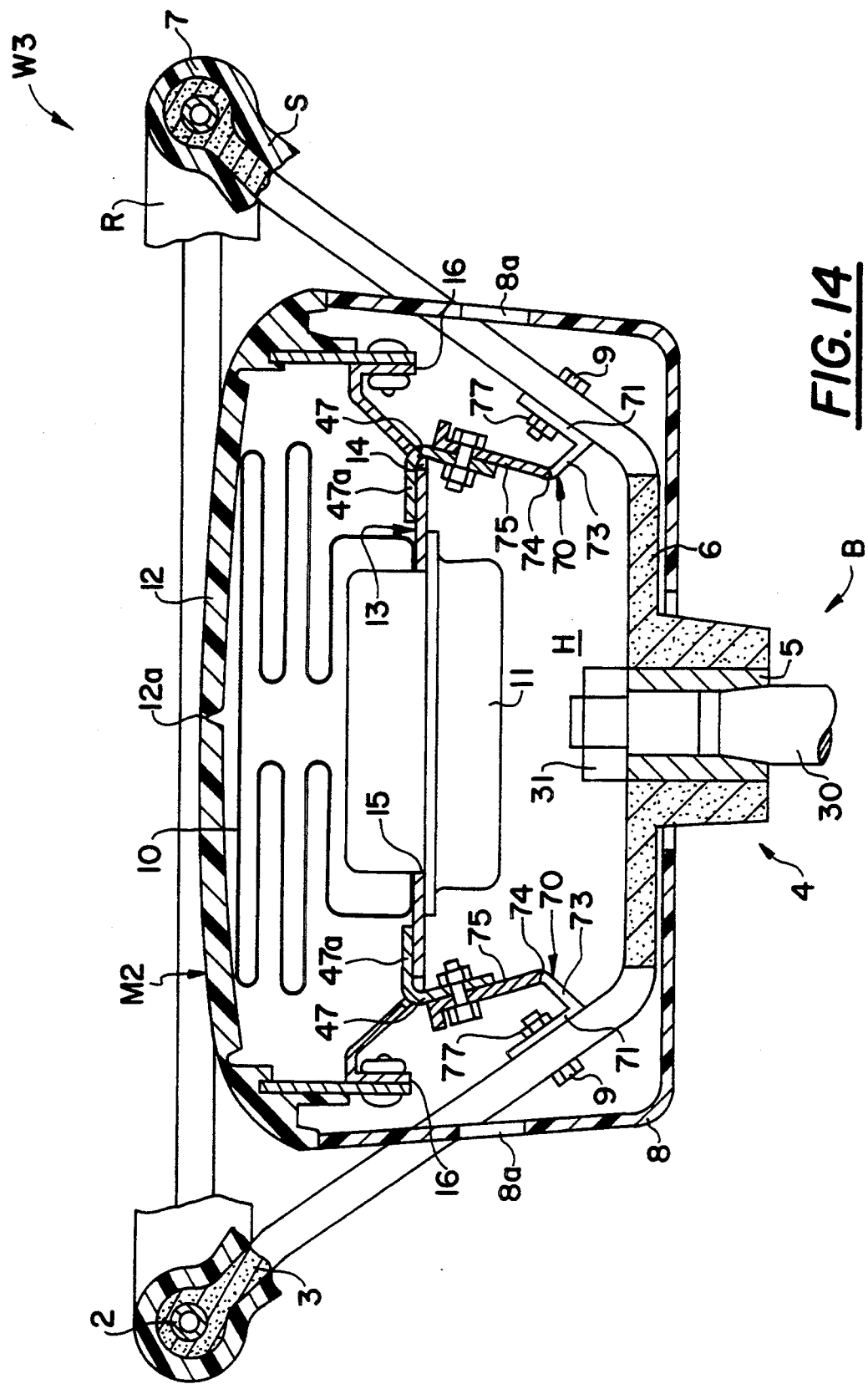
FIG. 14 is a cross-sectional view of the FIG. 15 embodiment taken along the line 14—14.

FIGS. 14 and 15 illustrate a third embodiment in accordance with the present invention. The steering wheel W3 of the third embodiment differs from the second embodiment in that the air bag device M2 is attached to the spokes S by brackets 70, 70.

The remainder of the structure of the steering wheel W3 of the third embodiment is identical to that of the second embodiment. In FIGS. 14 and 15, parts similar to those in FIGS. 7 through 12 are given the same reference numerals.

In the third embodiment, the bracket 70 is made of metal the same as bracket 50 of the second embodiment, such as plastically deformable steel, with a U-shape. Bracket 70 has a base portion 71 which is fixed to the spoke S by bolt 9 and a weld nut 77 welded to base portion 71. Bracket 70 also includes side portion 73, which extends upwardly from the base portion 71, has a bent portion 74 for deforming easily here and a supporting portion 75 for attaching to the connecting portions 47 of the bag holder 13. Connecting portions 47 are inclined in an upward and outward direction opposite to each other at the top of the side portion 73. Each supporting portion 75 is secured to a connecting portion 47 by respective bolts. The air bag device M2 is also assembled by the same steps as the first and second embodiments.

Since the supporting portion 47 of the bag holder 13 and the brackets 70 are deformed by impact energy the same as in the second embodiment, the steering wheel assembly according to the third embodiment also can absorb impact energy not only by inflation of the air bag device M2 but also by plastic deformation of both the connecting portions 47 and the supporting portions 75, thereby increasing the amount of impact energy that can be absorbed.

In addition, as in the first and second embodiments, according to the third embodiment of the present invention, if more impact energy acts after the deformation described above, the bent portions 74 of the bracket 70 are deformed so that the side portions 73 of the bracket 70 yield until air bag device M2 contacts the boss plate 6. Therefore, the impact energy is absorbed even more by the further yield of the bracket 70.

Furthermore, since the connecting portions 17 and 47 of the bag holder 13 and the supporting portions 25, 55 and 75 of the brackets 20, 50 and 70 of the present invention are respectively inclined in opposite directions relative to each other, the air bag devices M1, M2 and M3 can be stably supported and easily assembled.

Further, in these embodiments, although the holes 18 and 48 of the bag holder 13 are provided at the center of the width of the side wall portion 16 of the bag holder 13, they can be provided at the area moved to the edge of the side wall portion 16 in order to rotate the air bag device M1, M2 around the holes 18 and 48 more smoothly.

Additionally, in these embodiments, although bolts 27 are screwed into the nuts 19 through the holes 8a of the lower cover 8, the bolts 27, as shown in FIG. 16, can be held prior to the assembling. In FIG. 16, the bolt 27 has a groove 27a at the top, and it is held at a predetermined position by a bolt holder 58. The bolt holder 58 fixed on the supporting portion 55 by a projection 58a and a screw 59 is made of hard synthetic resin with tubular shape and holds the bolt 27 by the projection 58b at the predetermined position. In that way, the bolts can be readily screwed in by a screwdriver through holes 8a.

Further, in the first and second embodiment, although the bracket 20, 50 for supporting the air bag device is provided in one piece, it can be divided into a plurality of pieces.

Furthermore, in the first embodiment, since rigidness of the bracket is relatively weaker than that of the connecting portions, the bracket 20 is mainly deformed. Both the connecting portions 47 of the bag holder 13 and the bracket 50 are deformed in the second and third embodiments due to the impact energy. But if rigidness of the supporting portion is strong enough, only the connecting portions of the bag holder would be deformed for absorbing the impact energy.

What is claimed is:

1. A steering wheel assembly comprising:
   a ring portion;
   a boss portion having a boss for connecting to a steering shaft of a vehicle and a boss plate laterally extending from said boss;
   spoke means connecting said ring portion with said boss portion;
   bracket means made of plastically deformable metal having supporting portions inclined at an angle in directions outwardly toward said ring portion and being attached to one of said boss portion and spoke means; and
   an air bag device held at a predetermined distance from said boss plate by said bracket means,
   said air bag device including a folded expandable air bag, an inflater for inflating said air bag, a pad covering said air bag and a bag holder holding said air bag, said inflater and said pad, said bag holder having connecting portions inclined respectively at the same angle as said supporting portions of said bracket means, said connecting portions being rotatably connected to said supporting portions for causing deformation of said supporting portions to absorb energy from an impact with the air bag.

2. A steering wheel assembly claimed in claim 1, wherein said bracket means is a bracket having said supporting portions and being attached to said boss plate.

3. A steering assembly wheel claimed in claim 2, wherein said bracket has a U-shaped cross-section comprising a bottom portion for attaching to said boss plate, side portions extending upwardly from opposite side edges of said bottom portion and supporting portions for connecting to said connecting portions of said bag holder at the top of said side portions.

4. A steering wheel assembly claimed in claim 1, wherein said bracket means includes two separate brackets each having one of said supporting portions and being attached to said spoke means.

5. A steering wheel assembly claimed in claim 4, wherein each said bracket has a U-shaped cross-section comprising a base portion fixed to said spoke means, a side portion extending upwardly from said base portion and extending therefrom a said supporting portion.

6. A steering wheel assembly claimed in claim 1, wherein said connecting portions are plastically deformable metal and deform to adsorb energy from said impact with the air bag.

7. A steering wheel assembly claimed in claim 1, wherein said bracket means has a bent portion for absorbing additional impact energy.

* * * * *